United States Patent [19]
Nakamae et al.

[11] Patent Number: 6,156,840
[45] Date of Patent: Dec. 5, 2000

[54] METHOD FOR PRODUCING AQUEOUS EMULSION OF POLYURETHANE

[75] Inventors: Masato Nakamae; Seiji Tanimoto; Mitsuru Kato; Naoki Fujiwara, all of Kurashiki, Japan

[73] Assignee: Kuraray Co., Ltd., Kurashiki, Japan

[21] Appl. No.: 09/233,047

[22] Filed: Jan. 19, 1999

[30] Foreign Application Priority Data

Jan. 26, 1998 [JP] Japan .................................. 10-012552
Jan. 26, 1998 [JP] Japan .................................. 10-012553

[51] Int. Cl.$^7$ ................................ C08J 3/00; C08K 3/20; C08L 75/00; C08G 18/00
[52] U.S. Cl. ......................... 524/839; 524/507; 524/589; 524/590; 524/591; 524/840; 528/44
[58] Field of Search ..................................... 524/589, 590, 524/591, 829, 840, 507; 528/44

[56] References Cited

U.S. PATENT DOCUMENTS 5,652,299   7/1997   Nakajima et al. .

FOREIGN PATENT DOCUMENTS 0 783 030   7/1997   European Pat. Off. .
53-79990    7/1978   Japan .

OTHER PUBLICATIONS

Patent Abstracts of Japan, vol. 006, No. 114 (C–110), Jun. 25, 1982, JP 57 040575, Mar. 6, 1982.

Patent Abstracts of Japan, vol. 096, No. 001, Jan. 31, 1996, JP 07 247463, Sep. 26, 1995.

Derwent Abstract, AN 83–774233, JP 58 141274, Aug. 22, 1983.

*Primary Examiner*—Patrick D. Niland
*Attorney, Agent, or Firm*—Oblon, Spivak, McClelland, Maier & Neustadt, P.C.

[57] ABSTRACT

Provided is a method for producing a polyurethane (PU) emulsion having good solvent resistance and water resistance and having good compatibility with other aqueous emulsions to give stable mixtures with them. The method comprises reacting (A) a PU prepolymer having an isocyanate group in the molecule, (B) a modified PVA having at least one member selected from the group consisting of an amino group, a primary hydroxyl group and an acetoacetyl group and (C) a low-molecular compound having an amino group and/or a hydroxyl group, in an aqueous medium.

13 Claims, No Drawings

METHOD FOR PRODUCING AQUEOUS EMULSION OF POLYURETHANE

BACKGROUND OF THE INVENTION

1. Field of the Invention

The present invention relates to a method for producing an aqueous emulsion of polyurethane (hereinafter referred to as "PU". More precisely, it relates to a method for producing an aqueous PU emulsion having good solvent resistance and water resistance and having good compatibility with other aqueous emulsions to give stable mixtures with them.

2. Description of the Related Art

As a resin for caulking or sealing boundary areas between rubber and plastics, PU has many applications in various fields for coating materials, adhesives, artificial leathers, etc. Recently, aqueous PU has been increasing for meeting the social needs of environmental protection, resources saving, safety, etc. The recent progress in the technique of emulsifying and dispersing PU in water, the technique of self-emulsification and dispersion of PU through ionomerization and the technique of increasing the molecular weight of PU in water has been improving the properties of aqueous PU. In JP-A-53-79990, proposed is the use of a water-soluble salt of a condensate of an acidic amino acid and a fatty acid as the emulsifier for PU.

However, conventional aqueous PU is problematic in that it is often influenced by the emulsifier and others as used in producing it whereby the solvent resistance and water resistance intrinsic to PU is lowered. In addition, when aqueous PU is blended with other various aqueous emulsions, there often occurs another problem of poor compatibility between them.

SUMMARY OF THE INVENTION

The object of the invention is to provide a method for producing an aqueous PU emulsion having good solvent resistance and water resistance and having good compatibility with other aqueous emulsions to give stable mixtures with them.

We, the present inventors have assiduously studied so as to attain the object noted above, and, as a result, have found a method for producing an aqueous emulsion of polyurethane (hereinafter referred to as "PU emulsion"), which comprises reacting (A) a polyurethane prepolymer (hereinafter referred to as "PU prepolymer") having an isocyanate group in the molecule, (B) a modified polyvinyl alcohol (hereinafter referred to as "modified PVA") having at least one member selected from the group consisting of an amino group, a primary hydroxyl group and an acetoacetyl group and (C) a low-molecular compound having an amino group and/or a hydroxyl group, in an aqueous medium.

Accordingly, we have found the PU emulsion as produced through the reaction of (A) a PU prepolymer having an isocyanate group in the molecule, (B) a modified PVA having at least one member selected from the group consisting of an amino group, a primary hydroxyl group and an acetoacetyl group and (C) a low-molecular compound having an amino group and/or a hydroxyl group in an aqueous medium.

Further we have found a composition comprising the above PU emulsion and a compound having, in the molecule, at least two functional groups selected from aziridine, epoxy, oxazoline, oxazine, isocyanate and carbodiimide groups; an aqueous adhesive comprising the above PU emulsion or the above composition; and an aqueous coating agent comprising the above PU emulsion or the above composition.

Further we have further found the PU as produced through the reaction of (A) a PU prepolymer having an isocyanate group in the molecule, (B) a modified PVA having at least one member selected from the group consisting of an amino group, a primary hydroxyl group and an acetoacetyl group and (C) a low-molecular compound having an amino group and/or a hydroxyl group.

DESCRIPTION OF PREFERRED EMBODIMENTS OF THE INVENTION

The PU prepolymer (A) for use in the invention may be any and every PU having at least one isocyanate group in the molecule. For producing the PU prepolymer, for example, mentioned is a method of reacting a high-molecular polyol and an organic diisocyanate. This reaction is effected in the presence or absence of a solvent, for which a chain extender may be used.

The high-molecular polyol may have a number-average molecular weight falling preferably between 500 and 10000, more preferably between 700 and 5000, even more preferably between 750 and 4000. If its number-average molecular weight is outside the range noted above, the cold resistance, the water resistance and the solvent resistance of the film from the final PU emulsion will be poor.

The number (f) of hydroxyl groups to be in one molecule of the high-molecular polyol preferably falls between 2.0 and 4.0, more preferably between 2.0 and 3.0. Where the number (f) of hydroxyl groups to be in one molecule of the polyol falls within the range noted above, the water resistance and the solvent resistance of the film from the final PU emulsion significantly increase.

The high-molecular polyol includes, for example, polyester polyols, polycarbonate polyols, polyester polycarbonate polyols, polyether polyols, etc.

The polyester polyols may be obtained through direct esterification or interesterification of a polycarboxylic acid component and a polyol component. The polycarboxylic acid component includes, for example, polycarboxylic acids, their esters and anhydrides, etc.

As examples of the polycarboxylic acid component, mentioned are aliphatic dicarboxylic acids such as succinic acid, glutaric acid, adipic acid, pimelic acid, suberic acid, azelaic acid, sebacic acid, dodecane-diacid, 2-methylsuccinic acid, 2-methyladipic acid, 3-methyladipic acid, 3-methylpentane-diacid, 2-methyloctane-diacid, 3,8-dimethyldecane-diacid, 3,7-dimethyldecane-diacid, etc.; aromatic dicarboxylic acids such as isophthalic acid, terephthalic acid, phthalic acid, naphthalene-dicarboxylic acid, etc.; alicyclic dicarboxylic acids such as 1,4-cyclohexane-dicarboxylic acid, etc.; tricarboxylic acids such as trimellitic acid, trimesic acid, etc.; as well as their ester-forming derivatives such as their esters, anhydrides, etc. Of those, especially preferred are aliphatic carboxylic acids and their ester-forming derivatives. As the case may be, the polycarboxylic acid component preferably contains a small amount of a tri-functional or higher poly-functional polycarboxylic acid or its ester-forming derivative.

The polyol component includes, for example, aliphatic diols such as ethylene glycol, propylene glycol, 2-methyl-1,3-propanediol, 1,4-butanediol, 1,5-pentanediol, 1,6-hexanediol, 3-methyl-1,5-pentanediol, neopentyl glycol, 1,7-heptanediol, 1,8-octanediol, 1,9-nonanediol, 2-methyl-1,8-octanediol, 1,10-decanediol, etc.; alicyclic diols such as cyclohexane-dimethanol, cyclohexane-diol, etc.; triols such as glycerin, trimethylolpropane, butanetriol, hexanetriol, trimethylolbutane, trimethylolpentane, etc.; tetraols such as pentaerythritol, etc. Of those, preferred are aliphatic polyols. As the case may be, the polyol component preferably contains a small amount of a trifunctional or higher polyfunctional polyol.

The polycarbonate polyols may be obtained through reaction of a carbonate component and a polyol component.

The carbonate component includes, for example, dialkyl carbonates, alkylene carbonates, diaryl carbonates, etc. Examples of the dialkyl carbonates are dimethyl carbonate and diethyl carbonate. One example of the alkylene carbonates is ethylene carbonate. One example of the diaryl carbonates is diphenyl carbonate.

For examples of the polyol component, referred to are those mentioned hereinabove for the polyester polyols.

The polyester polycarbonate polyols may be those as obtained through reaction of a polyol, a polycarboxylic acid and a polycarbonate compound all at a time; those as obtained through reaction of a previously-prepared polyester polyol with a carbonate; those as obtained through reaction of a previously-prepared polycarbonate polyol with a polyol and a polycarboxylic acid; and those as obtained through reaction of a previously-prepared polyester polyol with a previously-prepared polycarbonate polyol.

The polyether polyols include, for example, polyethylene glycol, polypropylene glycol, polytetramethylene glycol, etc.

The organic diisocyanate may be any and every organic diisocyanate that may be used in producing ordinary PU emulsions. Especially preferred are alicyclic diisocyanates, aliphatic diisocyanates and aromatic diisocyanates having a molecular weight of not larger than 500. Specific examples of the organic diisocyanate include hexamethylene dulsocyanate, isophorone diisocyanate, 4,4'-dicyclohexylmethane diisocyanate, 2,4-tolylene diisocyanate, 2,6-tolylene diisocyanate, 4,4'-diphenylmethane diisocyanate, p-phenylene diisocyanate, xylylene diisocyanate, and 1,5-naphthylene diisocyanate.

In producing the PU prepolymer, a chain extender may be optionally used. The chain extender may be any ordinary one usable in producing ordinary PU emulsions. Especially preferred are low-molecular compounds having, in the molecule, at least 2 active hydrogen atoms capable of reacting with isocyanate groups and having a molecular weight of not larger than 300. As specific examples of the chain extender, mentioned are diols such as ethylene glycol, propylene glycol, 1,4-butanediol, 1,6-hexanediol, 1,4-bis(β-hydroxyethoxy)benzene, 1,4-cyclohexanediol, bis-(β-hydroxyethyl)terephthalate, xylylene glycol, etc.; triols such as trimethylolpropane, etc.; pentaols such as pentaerythritol, etc.; diamines, such as hydrazine, ethylenediamine, propylenediamine, xylylenediamine, isophoronediamine, piperazine and its derivatives, phenylenediamine, tolylenediamine, xylenediamine, adipic acid dihydrazide, isophthalic acid dihydrazide, etc.; aminoalcohols such as aminoethyl alcohol, aminopropyl alcohol, etc.

For producing the PU prepolymer, employable is any known method. For this, the reaction temperature preferably falls between 30 and 150° C., and the reaction may be effected in the presence or absence of an organic solvent. The organic solvent includes, for example, ketones such as acetone, methyl ethyl ketone, etc.; ethers such as tetrahydrofuran, dioxane, etc.; esters such as ethyl acetate, butyl acetate, etc.; amides such as dimethylformamide, N-methylpyrrolidone, etc.; aromatic hydrocarbons such as toluene, xylene, etc. Considering the easiness in removing the solvent from the final aqueous PU emulsion, preferred are acetone, methyl ethyl ketone, ethyl acetate and the like solvents having a boiling point of not higher than 100° C. For the purpose of lowering the viscosity of the prepolymers produced, any of the above-mentioned organic solvents may be added to the prepolymers.

In producing the PU prepolymer, a reaction catalyst may be added to the reaction system, if desired. The catalyst includes, for example, organic tin compounds such as tin octylate, monobutyltin triacetate, monobutyltin monooctylate, monobutyltin monoacetate, monobutyltin maleate, dibutyltin diacetate, dibutyltin dioctanoate, dibutyltin distearate, dibutyltin dilaurate, dibutyltin maleate, etc.; organic titanium compounds such as tetraisopropyl titanate, tetra-n-butyl titanate, etc.; tertiary amines such as triethylamine, N,N-diethylcyclohexylamine, N,N,N',N'-tetramethylethylenediamine, triethylenediamine, etc.

In producing the PU prepolymer, the equivalent ratio (R) of the isocyanate group to the total amount of active hydrogen atoms which the high-molecular polyol and the chain extender have falls preferably between 1.05 and 3.0, more preferably between 1.1 and 2.5. If R is smaller than 1.05, the reactivity of the PU prepolymer with the modified PVA (B) lowers, thereby resulting in that the water resistance and the solvent resistance of the film from the final PU emulsion could not be satisfactorily improved. If so, in addition, the viscosity of the PU prepolymer is too high, and it will be difficult to emulsify the PU prepolymer in water. On the other hand, if R is larger than 3.0, the emulsion to be produced through the reaction of the PU prepolymer with the modified PVA (B) and the low-molecular compound (C) having an amino group or a hydroxyl group will be unstable and will gel.

Next, the PU prepolymer is emulsified in water. For this, employable is any of a method of introducing a hydrophilic group into the molecule of the PU prepolymer to thereby make the prepolymer itself have self-emulsifiability; a method of forcedly emulsifying the PU prepolymer by the use of the modified PVA (B) having an amino group or a primary hydroxyl group; and a method of forcedly emulsifying the PU prepolymer by the use of a surfactant.

Using an active hydrogen atom-containing compound having a hydrophilic group in producing the PU prepolymer achieves the introduction of the hydrophilic group into the PU prepolymer. The active hydrogen atom-containing compound having a hydrophilic group may be any compound having at least one active hydrogen atom of a hydroxyl group, an amino group or the like and having at least one hydroxyl group that may be selected from anionic groups such as carboxylic acid groups, sulfonic acid groups, salts of carboxylic acids, salts of sulfonic acids, etc.; nonionic groups such as polyoxyethylene groups, etc.; and cationic groups such as tertiary amino groups, quaternary ammonium salts, etc. As specific examples of the compound, mentioned are carboxylic acid group-having compounds such as 2,2-dimethylolpropionic acid, 2,2-dimethylolbutyric acid, 2,2-dimethylolvaleric acid, their derivatives, etc.; sulfonic acid group-having compounds such as 1,3-phenylenediamine-4, 6-disulfonic acid, 2,4-diaminotoluene-5-sulfonic acid, their derivatives, etc.; nonionic group-having compounds such as polyoxyethylene glycols having a molecular weight of from 200 to 10,000, their monoalkyl ethers, etc.; tertiary amino group-having compounds such as 3-dimethylaminopropanol, their derivatives, etc. In addition, also employable herein are polyester polyols and polyester polycarbonate polyols to be produced through copolymerization of the above-mentioned, active hydrogen atom-containing and hydrophilic group-having compounds. In particular, especially preferred is a method of using an anionic group-having compound such as 2,2-dimethylolpropionic acid or the like in producing a PU prepolymer followed by adding, to the resulting prepolymer, a basic substance such as triethylamine, trimethylamine, sodium hydroxide, potassium hydroxide or the like to thereby convert the carboxylic acid moiety in the prepolymer into its salt. More preferably, in this method, at least a part of the anionic groups in the PU prepolymer formed are in the form of salts with the cationic compound.

Where the PU prepolymer is forcedly emulsified in the presence of a surfactant, it may have no hydrophilic group. The surfactant includes, for example, nonionic surfactants such as polyoxyethylene nonylphenyl ether, polyoxyethylene octylphenyl ether, polyoxyethylene lauryl ether, polyoxyethylene stearyl ether, polyoxyethylene-polyoxypropylene block copolymers, etc.; anionic surfactants such as sodium laurylsulfate, ammonium laurylsulfate, sodium dodecylbenzenesulfonate, sodium alkyldiphenyl ether -disulfonates, sodium di(2-ethylhexyl)sulfosuccinate, etc. Of those, preferred are nonionic surfactants having an HLB value of from 6 to 20.

The PU prepolymer may be emulsified in an emulsifying and dispersing device, such as a homomixer, a homogenizer or the like. For this, the emulsifying temperature is preferably not higher than 40° C., more preferably not higher than 30° C., in order to retard the reaction of the isocyanate group in the PU prepolymer with water.

The PU emulsion of the invention results from the reaction of the PU prepolymer (A), the modified PVA (B) having at least one member selected from the group consisting of an amino group, an primary hydroxyl group and an acetoacetyl group and the low-molecular compound (C) having an amino group and/or a hydroxyl group, in an aqueous medium. In one preferred embodiment, the component (A) is emulsified in an aqueous medium in the presence of the component (B), more preferably in the presence of the component (B) and a nonionic surfactant, and then the component (C) is added thereto to attain the reaction of the components (A), (B) and (C).

The modified PVA (B) for use in the invention shall have at least one member selected from the group consisting of an amino group, a primary hydroxyl group and an acetoacetyl group.

The modified PVA having an amino group (hereinafter referred to as "amino group-modified PVA") may be any modified PVA having a primary or secondary amino group in the molecule.

The amino group content of the amino group-modified PVA is preferably from 0.05 to 5% by weight, more preferably from 0.1 to 3% by weight, in terms of the amino group-derived nitrogen atom content relative to the total weight of the modified PVA.

The molecular weight of the amino group-modified PVA is preferably from 2,000 to 200,000, more preferably from 4,000 to 100,000, in terms of the viscosity-average molecular weight as calculated through limiting viscometry in dimethylsulfoxide (JIS).

The degree of hydrolysis of the amino group-modified PVA is preferably at least 50 mol %, more preferably at least 60 mol %, even more preferably at least 70 mol %.

If the amino group content of the amino group-modified PVA and the degree of polymerization (or the molecular weight) thereof are smaller than the ranges noted above, the water resistance and the solvent resistance of the film from the PU emulsion will be poor. On the other hand, if the amino group content of the amino group-modified PVA and the degree of polymerization (or the molecular weight) thereof are larger than the ranges noted above, the aqueous emulsion to be produced through the reaction of the PU prepolymer with the modified PVA will be unstable and will gel.

For producing the amino group-modified PVA, employable is any of a method of copolymerizing an ethylenic unsaturated monomer having a primary or secondary amino group or an ethylenic unsaturated monomer having a functional group capable of forming a primary or secondary amino group through hydrolysis or the like, with a vinyl ester, followed by hydrolyzing the resulting polymer; a method of processing a polymer having been prepared through copolymerization of an epoxy group-having monomer such as allyl glycidyl ether or the like and a vinyl ester, with an amino group-having mercaptan, at the epoxy group in the side chains of the polymer, in the presence of a catalyst such as sodium hydroxide or the like for addition reaction, followed by hydrolyzing the resulting polymer; a method of reacting a compound having, in the molecule, a functional group capable of reacting with the hydroxyl group of PVA and having a primary or secondary amino group with a modified PVA; and a method of polymerizing an ethylenic unsaturated monomer having a primary or secondary amino group in the presence of a mercapto group-having PVA.

The vinyl ester for the above includes, for example, vinyl formate, vinyl acetate, vinyl propionate, vinyl pivalate, etc. Of those, preferred is vinyl acetate.

The modified PVA having a primary hydroxyl group (hereinafter referred to as "primary hydroxyl group-modified PVA") may be any modified PVA having a primary hydroxyl group in the molecule.

The primary hydroxyl group content of the primary hydroxyl group-modified PVA is preferably from 0.1 to 15 mol %, more preferably from 0.2 to 10 mol %.

The degree of polymerization of the primary hydroxyl group-modified PVA is preferably from 50 to 4000, more preferably from 100 to 2000.

The degree of hydrolysis of the primary hydroxyl group-modified PVA is preferably at least 50 mol %, more preferably at least 60 mol %, even more preferably at least 70 mol %.

If the primary hydroxyl group content of the primary hydroxyl group-modified PVA and the degree of polymerization (or the molecular weight) thereof are smaller or larger than the ranges noted above, the aqueous PU emulsion as well as the film from it will suffer the same problems as those with the amino group-modified PVA noted above.

The primary hydroxyl group-modified PVA may be produced, for example, by hydrolyzing a copolymer to be prepared through copolymerization of a monomer capable of giving, after hydrolysis, a structure unit having a primary hydroxyl group with a vinyl ester.

The monomer capable of giving a structure unit having a primary hydroxyl group after hydrolysis includes monomers of the following formulae (I) and (II):

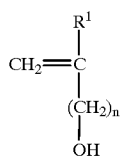

(I)

wherein n represents an integer of from 1 to 20, and R1 represents H or CH3.

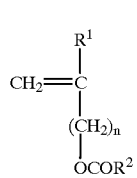

(II)

wherein n represents an integer of from 1 to 20, $R^1$ represents H or $CH_3$, and $R^2$ represents H, $CH_3$, $CH_2CH_3$ or $CH_2CH_2CH_3$.

In formulae (I) and (II), n is preferably from 1 to 20, more preferably from 1 to 10.

Examples of the monomers having the structure of formula (I) or (II) include 2-propen-1-ol, 3-buten-1-ol, 5-hexen-1-ol, 7- octen-1-ol, 9-decen-1-ol, 2-methyl-2 -propen-1-ol, 3-methyl-3-buten-1-ol, and their formates, acetates, propionates, etc.

For examples of the vinyl ester, referred to are those mentioned hereinabove for the amino group-modified PVA.

The primary hydroxyl group-modified PVA may be produced in any method other than the method mentioned hereinabove. The other methods are, for example, a method of polymerizing a vinyl ester in the presence of a thiol compound having a primary hydroxyl group in the molecule, such as 2-mercaptoethanol or the like, followed by hydrolyzing the resulting polymer to give a modified PVA having a primary hydroxyl group at the terminal; and a method of copolymerizing a vinyl ester with an epoxy-containing monomer such as allyl glycidyl ether or the like, then processing the resulting copolymer with a primary hydroxyl group-having thiol compound such as 2-mercaptoethanol or the like for addition reaction at the epoxy group of the copolymer, and thereafter hydrolyzing the thus-processed copolymer to give a primary hydroxyl group-modified PVA.

The acetoacetyl group-modified PVA is, for example, one prepared through solid-vapor reaction of PVA with diketene. The amount of the acetoacetyl group is preferably 0.1~15 mol %, more preferably 0.2~10 mol %. The degree of polymerization and the degree of hydrolysis of the acetoacetyl group-modified PVA is preferably within the same scope as ones of the above mentioned primary hydroxyl group-modified PVA.

Among the above modified PVAS, the amino group-modified PVA and the primary hydroxyl group-modified PVA is effectively used in this invention.

These modified PVA may be copolymerized with any other ethylenic unsaturated monomers except those mentioned above, without interfering with the effect of the invention. The additional ethylenic unsaturated monomers include, for example, ethylene, propylene, isobutene, acrylic acid, methacrylic acid, fumaric acid, maleic acid (anhydride), itaconic acid (anhydride), acrylonitrile, methacrylonitrile, acrylamide, methacrylamide, trimethyl-(3-acrylamido-3-dimethylpropyl)-ammonium chloride, acrylamido-2-methylpropanesulfonic acid and its sodium salt, ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinylsulfonate, sodium allylsulfonate, etc.

The amount of the modified PVA (B) to be reacted is preferably from 0.2 to 20 parts by weight, more preferably from 0.5 to 15 parts by weight, relative to 100 parts by weight of the PU prepolymer (A). If the amount of the modified PVA reacted is smaller than 0.2 parts by weight, the water resistance and the solvent resistance of the film from the PU emulsion produced will be poor. On the other hand, if the amount of the modified PVA reacted is larger than 20 parts by weight, the emulsion being produced through the reaction of the modified PVA with the PU prepolymer will be unstable and will gel.

The modified PVA is added to the reaction system generally in the form of its aqueous solution. If desired, however, it may be dissolved in an organic solvent of, for example, ketones such as acetone, methyl ethyl ketone, etc.; ethers such as tetrahydrofuran, dioxane, etc.; esters such as ethyl acetate, butyl acetate, etc.; amides such as dimethylformamide, N-methylpyrrolidone, etc.; or in a mixed solvent of any of these with water, prior to being added to the reaction system.

The low-molecular compound (C) having an amino group and/or a hydroxyl group is a low-molecular compound which has an active hydrogen atom in the form of any one selected from a primary amino group, a secondary amino group, a primary hydroxyl group and a secondary hydroxyl group. Preferably, the low-molecular compound has, in the molecule, an active hydrogen atom capable of reacting with an isocyanate group. It is desirable that the molecular weight of the low-molecular compound is at most 300. Specific examples of the low-molecular compound include triamines such as diethylenetriamine, etc.; diamines such as hydrazine, ethylenediamine, propylenediamine, xylylenediamine, isophoronediamine, piperazine and its derivatives, phenylenediamine, tolylenediamine, xylenediamine, adipic acid dihydrazide, isophthalic acid dihydrazide, etc.; monoamines such as ethylamine, propylamine, butylamine, morpholine, etc.; aminoalcohols such as aminoethyl alcohol, aminopropyl alcohol, etc.; diols such as ethylene glycol, propylene glycol, 1,4-butanediol, 1,6-hexanediol, 1,4-bis($\beta$-hydroxyethoxy)benzene, 1,4-cyclohexanediol, bis-($\beta$-hydroxyethyl)terephthalate, xylylene glycol, etc.

It is desirable that the total amount of the active hydrogen atoms in the low-molecular compound (C) falls between 0.70 and 1.20 equivalents, more preferably between 0.75 and 1.15 equivalents, even more preferably between 0.80 and 1.10 equivalents, relative to the total amount of the isocyanate groups in the PU prepolymer (A). If the total amount of the active hydrogen atoms in (C) is smaller than 0.70 equivalents or larger than 1.20 equivalents, the degree of polymerization of PU could not satisfactorily increase, thereby probably resulting in that the water resistance and the solvent resistance of the film from the PU emulsion are poor.

The PU emulsion of the invention is generally so controlled as to have a solid concentration of approximately from 20 to 65% by weight. Where an organic solvent is used in producing the PU prepolymer, it may be removed through distillation or stripping, if desired.

The PU emulsion of the invention contains a polymer having both a PU structure and a PVA structure. The polymer is postulated to have a bonding mode of the following general formula (1) or (2), while contributing to the expression of the properties of the PU emulsion of the invention.

PU-NHCONR-PVA (1)

wherein PU indicates a PU structure; PVA indicates a PVA structure; and R represents H, CH3 or CH2CH3.

PU-NHCOO-PVA (2)

wherein PU indicates a PU structure; and PVA indicates a PVA structure.

Incorporating a compound having, in the molecule, at least two functional groups selected from aziridine, epoxy, oxazoline, oxazine, isocyanate and carbodiimide groups into the PU emulsion of the invention gives an aqueous resin composition having more excellent water resistance and solvent resistance, and also excellent heat resistance, weather resistance, aging resistance and adhesiveness to substrates.

The compound having, in the molecule, at least two functional groups selected from aziridine, epoxy, oxazoline, oxazine, isocyanate and carbodiimide groups is not specifically defined, provided that it has the functional groups noted above, and it includes water-soluble or water-dispersible ones.

Examples of the compound having at least two epoxy groups in the molecule include glycidyl ethers such as bisphenol A diglycidyl ether, bisphenol A di-b-methylglycidyl ether, bisphenol F diglycidyl ether, tetrahydroxyphenylmethane tetraglycidyl ether, resorcinol diglycidyl ether, bromobisphenol A diglycidyl ether, chlorobisphenol A diglycidyl ether, hydrogenated bisphenol A diglycidyl ether, diglycidyl ethers of bisphenol A-alkylene oxide adducts, novolak glycidyl ethers, polyalkylene glycol diglycidyl ethers, glycerin triglycidyl ether, pentaerythritol diglycidyl ether, epoxyurethane resins, etc.; glycidyl ether esters such as p-hydroxybenzoic acid glycidyl ether esters, etc.; glycidyl esters such as diglycidyl phthalate, diglycidyl tetrahydrophthalate, diglycidyl hexahydrophthalate, diglycidyl acrylate, diglycidyl esters of dimer acids, etc.; glycidylamines such as glycidylaniline, tetraglycidyldiaminodiphenylmethane, triglycidyl isocyanurate, triglycidylaminophenol, etc.; linear aliphatic epoxy resins such as polybutadiene epoxides, soybean oil epoxides, etc.; alicyclic epoxy resins such as 3,4-epoxy-6-methylcyclohexylmethyl-3,4-epoxy-6-methylcyclohexanecarboxylate, 3,4-epoxycyclohexylmethyl (3,4-epoxycyclohexane) carboxylate, bis(3,4-epoxy-6-methylcyclohexylmethyl) adipate, vinylcyclohexene-diepoxide, dicyclopentadiene oxide, bis(2,3-epoxycyclopentyl) ether, limonene dioxide, etc.; polyamidoepichlorohydrins, etc.

The compound having aziridine groups in the molecule includes, for example, 2,4,6-tris(1'-aziridinyl)-1,3,5-triazine, ω-aziridinylpropionic acid-2,2'-dihydroxymethylbutanol-triester, 4,4'-bis(ethyleniminocarbonylamino) diphenylmethane, etc.

The compound having oxazoline or oxazine groups in the molecule includes, for example, 2,2'-ethylenebis(2-oxazoline), 2,2'-p-phenylenebis(2-oxazoline), 2,2'-ethylenebis(2-oxazine), 2,2'1-p-phenylenebis(2-oxazine), as well as polymers to be prepared through polymerization of unsaturated oxazolines or oxazines, such as 2-vinyl-2-oxazoline, 2-isopropenyl-2-oxazoline or the like, with other unsaturated compounds, etc.

The compound having isocyanate groups in the molecule includes, for example, butane-1,4-diisocyanate, 1,6-hexanediisocyanate, dicyclohexylmethanediisocyanate, cyclohexanediisocyanate-(1,4), 1-methylcyclohexane-2,4-diisocyanate, 1-methylcyclohexane-2,6-diisocyanate, 1,3-phenylenediisocyanate, 1,4-phenylenediisocyanate, 2,4-toluylenediisocyanate, 2,6-toluylenediisocyanate, 4,4'-diphenylmethanediisocyanate, etc. The compound having carbodiimide groups may be any ordinary carbodiimide compounds, including, for example, Nisshinbo's "Carbodilite V-01, 02, 03, 04, 06", "Carbodilite HMV-8CA", "Carbodilite 10M-SP", "Carbodilite IM-25P", "Carbodilite 9010", "Carbodilite 9010 ST", etc.

The amount of the compound having, in the molecule, at least two functional groups selected from aziridine, epoxy, oxazoline, oxazine, isocyanate and carbodiimide groups to be added to the PU emulsion preferably falls between 0.1 to 70 parts by weight, more preferably between 0.2 and 50 parts by weight, in terms of the solid content of the compound relative to 100 parts by weight of the PU emulsion. Overstepping the defined range is problematic in that the composition cures insufficiently and the film of the composition is brittle.

If desired, the PU emulsion of the invention may additionally contain any known emulsions. The additional emulsions include, for example, polyvinyl acetate emulsions, ethylene-vinyl acetate copolymer emulsions, (meth)acrylate (co)polymer emulsions, styrene-butadiene copolymer emulsions, and epoxy emulsions.

Also if desired, for controlling its dryability, settability, viscosity and film-formability, the PU emulsion of the invention may optionally contain various additives of, for example, organic solvents such as N-methylpyrrolidone, toluene, perclene, dichlorobenzene, trichlorobenzene, etc.; water-soluble polymers such as starch, modified starch, oxidized starch, sodium alginate, carboxymethyl cellulose, methyl cellulose, hydroxymethyl cellulose, maleic anhydride/isobutylene copolymer, maleic anhydride/styrene copolymer, maleic anhydride/methyl vinyl ether copolymer, PVA, etc.; thermosetting resins such as urea/formalin resin, urea/melamine/formalin resin, phenol/formalin resin, etc.; fillers such as clay, kaolin, talc, calcium carbonate, wood powder, etc.; vehicles such as wheat flour, etc.; reaction promoters such as boric acid, aluminium sulfate, etc.; pigments such as titanium oxide, etc.; antioxidants; ultraviolet absorbents; defoaming agents; leveling agents; anti-freezing agents; preservatives; rust inhibitors, etc.

The above mentioned PU emulsion, especially the above mentioned PU emulsion composition is effectively used as aqueous adhesive, aqueous paint, aqueous coating agent.

The invention is described in more detail with reference to the following Examples and Comparative Examples, which, however, are not intended to restrict the scope of the invention. Unless otherwise specifically indicated, "part" and "%" in Examples and Comparative Examples are all by weight.

The solvent resistance and the water resistance of the film of the PU emulsion (hereinafter referred to as "Em") produced, and the compatibility of the PU emulsion with other emulsions to give stable mixtures were measured according to the methods mentioned below.

Solvent-Resistance of Film of PU Emulsion

A PU emulsion sample was cast at 500° C. to form a film. The film was heated at 120° C. for 10 minutes, and then dipped in toluene at 90° C. for 1 hour. The degree of dissolution of the film in toluene, and the degree of area swelling of the dipped film were obtained according to the following equations.

Degree of Dissolution (%)={(W1−W2)/W1}×100 wherein;

W1 is the weight of the film before dipped,
W2 is the weight of the film after dipped.

Degree of Area Swelling (%)={(A1−A2)/A1}×100 wherein;

A1 is the area of the film before dipped,
A2 is the area of the film after dipped.

Water Resistance of Film of PU Emulsion

A PU emulsion sample was cast at 50° C. to form a film. The film was heated at 120° C. for 10 minutes, and then dipped in water at 20° C. for 24 hours. The degree of dissolution of the film in water, and the degree of area swelling of the dipped film were obtained according to the same equations as above.

Compatibility of PU Emulsion with Other Emulsions to Give Stable Mixtures

To 20 g of a PU emulsion sample, added was 80 g of an ethylene-vinyl acetate copolymer emulsion (EVA-Em) (OM-4200 from Kuraray, having a solid concentration of 55%), and mixed. The mixture was checked for its stability according to the following criteria.

◯: No change (good stability).

Δ: Slightly coagulated or phase-separated.

×: Extremely coagulated or phase-separated.

Abbreviations for the compounds used in the following Examples and Comparative Examples are mentioned below.

PMPA2150: Polyester-diol having a number-average molecular weight of 2150 (this was produced through reaction of 3-methyl-1,5-pentanediol with adipic acid).

PMPA3600: Polyester-diol having a number-average molecular weight of 3600 (this was produced through reaction of 3-methyl-1,5-pentanediol with adipic acid).

PTMG2000: Polytetramethylene glycol having a number-average molecular weight of 2000.

PCL2000: Polycaprolactone glycol having a number-average molecular weight of 2000.

IPDI: Isophorone diisocyanate.

HMDI: Methylene bis(4-cyclohexylisocyanate).

TDI: 2,4-Tolylene diisocyanate.

DMPA: 2,2-Bis(hydroxymethyl)propionic acid.

TEA: Triethylamine.

DETA: Diethylenetriamine.

IPDA: Isophoronediamine.

EDA: Ethylenediamine.

MEK: methl ethyl ketone [2-Butanone].

PRODUCTION EXAMPLES OF AMINO GROUP-MODIFIED PVA

Reference Example 1

405 parts of vinyl acetate monomer, 11 parts of allyl glycidyl ether and 30 parts of methanol were fed into a reactor equipped with a ref lux condenser, and fully purged with nitrogen. An initiator solution as prepared by dissolving 4.5 parts of 2,2'-azobisisobutyronitrile in 15 parts of methanol was added to the monomer mixture, which was then polymerized at 20° C. for 4 hours. Cooling the system stopped the polymerization. The solid concentration in the reaction mixture was 54.8%. The non-reacted vinyl acetate monomer was removed under pressure at 30° C., with methanol added at intervals, to obtain a methanol solution of polyvinyl acetate copolymer (solid concentration: 44.5%).

100 parts of the methanol solution of polyvinyl acetate copolymer having been prepared in the above was fed into a reactor equipped with a reflux condenser, and fully purged with nitrogen. A solution of 8.0 parts of 2-aminothiophenol and 0.03 parts of sodium hydroxide dissolved in 48 parts of methanol was added to this, and reacted at 50° C. for 2 hours.

20 parts of a methanol solution of 10% sodium hydroxide was added to the reaction mixture and left at 40° C. for 5 hours, whereby the copolymer was hydrolyzed. The resulting reaction product was ground, and neutralized with 8 parts of acetic acid added thereto. Using a Soxhlet extractor, this was washed with methanol for 48 hours, and then dried at 60° C. for 20 hours to obtain a primary amino group-having PVA (hereinafter referred to as "amino group-modified PVA ①". The IR and 1H-NMR spectrometry of the amino group-modified PVA ① verified the complete absence of the epoxy group in ①, the introduction of the amino group-derived nitrogen atom in ① in an amount of 0.67% by weight, any the degree of hydrolysis of ① of being 99.0 mol %. The limiting viscosity of the amino group-modified PVA ① in dimethylsulfoxide was measured (JIS), from which the viscosity-average molecular weight of ① was calculated to be 40,000.

Reference Example 2

A vinyl acetate copolymer was prepared in the same manner as in Reference Example 1, except that 400 parts of vinyl acetate monomer and 19.3 parts of allyl glycidyl ether were used herein.

The copolymer was processed in the same manner as in Reference Example 1, except that 20 parts of 2-aminothiophenol was used herein, to obtain a primary amino group-having PVA (hereinafter referred to as "amino group-modified PVA ②".

The IR and 1H-NMR spectrometry of the amino group-modified PVA ② verified the complete absence of the epoxy group in ②, the introduction of the amino group-derived nitrogen atom in ② in an amount of 1.11% by weight, and the degree of hydrolysis of ② of being 97.5 mol %. The limiting viscosity of the amino group-modified PVA ② in dimethylsulfoxide was measured (JIS), from which the viscosity-average molecular weight of ② was calculated to be 35,000.

Reference Example 3

A vinyl acetate copolymer was prepared in the same manner as in Reference Example 1, except that 350 parts of vinyl acetate monomer and 24.4 parts of allyl glycidyl ether were used herein.

The copolymer was processed in the same manner as in Reference Example 1, except that 28 parts of 2-aminothiophenol and 10 parts of the hydrolysis catalyst, methanol solution of sodium hydroxide were used herein, to obtain a primary amino group-having PVA (hereinafter referred to as "amino group-modified PVA ③".

The IR and 1H-NMR spectrometry of the amino group-modified PVA ③ verified the complete absence of the epoxy group in ③, the introduction of the amino group-derived nitrogen atom in ③ in an amount of 1.77% by weight, and the degree of hydrolysis of ③ of being 88.5 mol %. The limiting viscosity of the amino group-modified PVA ③ in dimethylsulfoxide was measured (JIS), from which the viscosity-average molecular weight of ③ was calculated to be 15,000.

PRODUCTION OF POLYURETHANE EMULSION

Example 1

537.5 g of PMPA2150, 111.1 g of IPDI and 6.71 g of DMPA were fed into a 3-liter three-neck flask. Stirring them in a dry nitrogen atmosphere at 90° C. for 2 hours brought about quantitative reaction at the hydroxyl group to give an isocyanato-terminated prepolymer.

202.9 g of MEK was added to this and uniformly stirred, and the temperature inside the flask was lowered to 40° C. 5.06 g of TEA was added to this, and stirred for 10 minutes. Next, an aqueous solution as prepared by dissolving 14.5 g of an emulsifier, Emulgen 985 (from Kao, this is a nonionic surfactant, polyoxyethylene nonylphenyl ether) in 420 g of distilled water was added to the prepolymer, which was then stirred and emulsified for 1 minute by the use of a homomixer. The emulsion thus prepared is hereinafter referred to as "emulsion A".

Immediately after the emulsion A was prepared, an aqueous solution of 34.0 g of the amino group-modified PVA ①, 7.58 g of DETA and 12.52 g of IPDA in 652 g of distilled water was added to this, and reacted for 1 minute with stirring it by the use of a homomixer. Next, MEK was evaporated by the use of a rotary evaporator to obtain a PU emulsion having a solid concentration of 40%. This is hereinafter referred to as "PU emulsion A". The PU emulsion A was evaluated, and the results are shown in Table 1.

Example 2

540.0 g of PMPA3600, 80.0 g of IPDI and 6.04 g of DMPA were fed into a 3-liter three-neck flask. Stirring them in a dry nitrogen atmosphere at 90° C. for 2 hours brought about quantitative reaction at the hydroxyl group to give an isocyanato-terminated prepolymer.

191.4 g of MEK was added to this and uniformly stirred, and the temperature inside the flask was lowered to 40° C. 4.55 g of TEA was added to this, and stirred for 10 minutes. Next, an aqueous solution as prepared by dissolving 19.1 g of an emulsifier, Emulgen 985 (from Kao) in 397 g of distilled water was added to the prepolymer, which was then stirred and emulsified for 1 minute by the use of a homomixer. The emulsion thus prepared is hereinafter referred to as "emulsion B".

Immediately after the emulsion B was prepared, an aqueous solution of 64.1 g of the amino group-modified PVA ② in 420 g of distilled water was added to this, and stirred for 30 seconds by the use of a homomixer. Next, an aqueous solution of 10.21 g of DETA in 240 g of distilled water was added to this, and reacted for 1 minute with stirring it by the use of a homomixer. Next, MEK was evaporated by the use of a rotary evaporator to obtain a PU emulsion having a solid concentration of 40%. This is hereinafter referred to as "PU emulsion B". The PU emulsion B was evaluated, and the results are shown in Table 1.

Example 3

250.0 g of PTMG2000, 250.0 g of PCL2000, 118.1 g of HMDI and 6.71 g of DMPA were fed into a 3-liter three-neck flask. Stirring them in a dry nitrogen atmosphere at 80° C. for 2 hours brought about quantitative reaction at the hydroxyl group to give an isocyanato-terminated prepolymer.

188.7 g of MEK was added to this and uniformly stirred, and the temperature inside the flask was lowered to 40° C. 5.06 g of TEA was added to this, and stirred for 10 minutes. Next, an aqueous emulsifier solution as prepared by dissolving 6.7 g of Emulgen 985 (from Kao) and 6.7 g of Emulgen 930 (from Kao, this is a nonionic surfactant, polyoxyethylene nonylphenyl ether) in 392 g of distilled water was added to the prepolymer, which was then stirred and emulsified for 1 minute by the use of a homomixer. The emulsion thus prepared is hereinafter referred to as "emulsion C".

Immediately after the emulsion C was prepared, an aqueous solution of 32.2 g of the amino group-modified PVA ③, 6.81 g of DETA and 5.62 g of IPDA in 620 g of distilled water was added to this, and stirred for 1 minute by the use of a homomixer. Next, MEK was evaporated by the use of a rotary evaporator to obtain a PU emulsion having a solid concentration of 40%. This is hereinafter referred to as "PU emulsion C". The PU emulsion C was evaluated, and the results are shown in Table 1.

Example 4

1537.5 g of PMPA2150, 87.1 g of TDI and 6.71 g of DMPA were fed into a 3-liter three-neck flask. Stirring them in a dry nitrogen atmosphere at 70° C. for 2 hours brought about quantitative reaction at the hydroxyl group to give an isocyanato-terminated prepolymer.

194.6 g of MEK was added to this and uniformly stirred, and the temperature inside the flask was lowered to 40° C. 5.06 g of TEA was added to this, and stirred for 10 minutes. The dispersion thus prepared is hereinafter referred to as "dispersion D". Next, an aqueous solution as prepared by dissolving 16.5 g of an emulsifier, Emulgen 985 (from Kao) and 32.4 g of the amino group-modified PVA ① in 520 g of distilled water was added to the dispersion D, which was then stirred and emulsified for 1 minute by the use of a homomixer. The emulsion thus prepared is hereinafter referred to as "emulsion D".

Immediately after the emulsion D was prepared, an aqueous solution of 7.59 g of DETA and 4.42 g of EDA in 494 g of distilled water was added to this, and reacted for 1 minute with stirring it by the use of a homomixer. Next, MEK was evaporated by the use of a rotary evaporator to obtain a PU emulsion having a solid concentration of 40%. This is hereinafter referred to as "PU emulsion D". The PU emulsion D was evaluated, and the results are shown in Table 1.

Example 5

537.5 g of PMPA2150, 194.5 g of IPDI, 33.53 g of DMPA and 249.1 g of MEK were fed into a 3-liter three-neck flask. Stirring them in a dry nitrogen atmosphere at 60° C. for 8 hours brought about quantitative reaction at the hydroxyl group to give an isocyanato-terminated prepolymer. After the reaction, the temperature inside the flask was lowered to 40° C.

25.30 g of TEA was added to this, and stirred for 30 minutes. Next, 720.0 g of distilled water was added thereto, and stirred and emulsified for 1 minute by the use of a homomixer. The emulsion thus prepared is hereinafter referred to as "emulsion E".

Immediately after the emulsion E was prepared, an aqueous solution of 41.8 g of the amino group-modified PVA ②, 17.02 g of DETA and 14.05 g of IPDA in 576 g of distilled water was added to this, and stirred for 1 minute by the use of a homomixer. Next, MEK was evaporated by the use of a rotary evaporator to obtain a PU emulsion having a solid concentration of 40%. This is hereinafter referred to as "PU emulsion E". The PU emulsion E was evaluated, and the results are shown in Table 1.

Example 6

Immediately after the emulsion A was prepared in Example 1, an aqueous solution of 34.0 g of a primary hydroxyl group-modified PVA (having a degree of modification with 7-octen-1-ol of 1.1 mol %, a degree of polymerization of 300, and a degree of hydrolysis of 97.8 mol %), 7.58 g of DETA and 12.5 g of IPDA in 652 g of distilled water was added to this, and reacted for 1 minute with stirring it by the use of a homomixer. Next, MEK was evaporated by the use of a rotary evaporator to obtain a PU emulsion having a solid concentration of 40%. This is hereinafter referred to as "PU emulsion F". The PU emulsion F was evaluated, and the results are shown in Table 1.

Example 7

Immediately after the emulsion B was prepared in Example 2, an aqueous solution of 64.1 g of a primary hydroxyl group-modified PVA (having a degree of modification with 2-propen-1-ol of acetates of 1.3 mol %, a degree of modification with itaconic acid of 1.5 mol %, a degree of polymerization of 200, and a degree of hydrolysis of 95.5 mol %) in 420 g of distilled water was added to this, and reacted for 30 seconds with stirring it by the use of a homomixer. Next, a solution of 10.21 g of DETA in 240 g of distilled water was added to this, and further reacted for 1 minute with stirring it by the use of a homomixer. Next, MEK was evaporated by the use of a rotary evaporator to obtain a PU emulsion having a solid concentration of 40%. This is hereinafter referred to as "PU emulsion G". The PU emulsion G was evaluated, and the results are shown in Table 1.

Example 8

Immediately after the emulsion C was prepared in Example 3, an aqueous solution of 32.2 g of a primary hydroxyl group-modified PVA (having a degree of modification with 2-methyl-2-propen-1-ol of 2.5mol %, a degree of polymerization of 500, and a degree of hydrolysis of 88.8 mol %), 6.81 g of DETA and 5.62 g of IPDA in 620 g of distilled water was added to this, and reacted for 1 minute with stirring it by the use of a homomixer. Next, MEK was evaporated by the use of a rotary evaporator to obtain a PU emulsion having a solid concentration of 40%. This is hereinafter referred to as "PU emulsion H". The PU emulsion H was evaluated, and the results are shown in Table 1.

Example 9

Immediately after the emulsion D was prepared in Example 4, an aqueous solution of 16.5 g of an emulsifier, Emulgen 985 (from Kao) and 32.4 g of a primary hydroxyl group-modified PVA (having a degree of modification with 7-octen-1-ol of 1.1 mol %, a degree of polymerization of 300, and a degree of hydrolysis of 97.8 mol %) in 520 g of distilled water was added to this, and reacted for 1 minute with stirring it by the use of a homomixer. The emulsion thus prepared is hereinafter referred to as "Emulsion I".

Immediately after the emulsion I was prepared, an aqueous solution of 7.59 g of DETA and 4.42 g of EDA in 494 g of distilled water was added to this, and reacted for 1 minute with stirring it by the use of a homomixer. Next, MEK was evaporated by the use of a rotary evaporator to obtain a PU emulsion having a solid concentration of 40%. This is hereinafter referred to as "PU emulsion I". The PU emulsion I was evaluated, and the results are shown in Table 1.

Example 10

Immediately after the emulsion E was prepared in Example 5, an aqueous solution of 41.8 g of a primary hydroxyl group-modified PVA (having a degree of modification with 2-propen-1-ol of 1.3 molt, a degree of modification with itaconic acid of 1.5 molt, a degree of polymerization of 200, and a degree of hydrolysis of 95.5 mol %), 17.02 g of DETA and 14.05 g of IPDA in 576 g of distilled water was added to this, and reacted for 1 minute with stirring it by the use of a homomixer. Next, MEK was evaporated by the use of a rotary evaporator to obtain a PU emulsion having a solid concentration of 40%. This is hereinafter referred to as "PU emulsion J". The PU emulsion J was evaluated, and the results are shown in Table 1.

Comparative Example 1

A PU emulsion was tried in the same manner as in Example 1, except that the amino group-modified PVA ① was not used herein, but in vain. Adding the aqueous solution of DETA and IPDA to the reaction system gave a gel but not any stable emulsion.

Comparative Example 2

A PU emulsion was produced in the same manner as in Example 1, except that 38.7 g of Emulgen 985 (from Kao) was used but the amino group-modified PVA ① was not used herein. This is hereinafter referred to as "PU emulsion K". The PU emulsion K was evaluated, and the results are shown in Table 1.

Comparative Example 3

34.0 g of the amino group-having PVA ① was added to the PU emulsion K having been prepared in Comparative Example 2, and dissolved therein under heat to produce a PU emulsion. The PU emulsion thus produced is hereinafter referred to as "PU emulsion L". The PU emulsion L was evaluated, and the results are shown in Table 1.

Comparative Example 4

A PU emulsion was produced in the same manner as in Example 1, except that a non-modified polyvinyl alcohol (having a molecular weight of 40,000 and a degree of hydrolysis of 98.8 mol %) was used in place of the amino group-having PVA ① and 38.7 g of Emulgen 985 was used. This is hereinafter referred to as "PU emulsion M". The PU emulsion M was evaluated, and the results are shown in Table 1.

Comparative Example 5

34.0 g of a primary hydroxyl group-modified PVA (having a degree of modification with 7-octen-1-ol of 1.1 mol %, a degree of polymerization of 300 and a degree of hydrolysis of 97.8 mol %) was added to the PU emulsion K having been prepared in Comparative Example 2, and dissolved therein under heat to produce a PU emulsion. The PU emulsion thus produced is hereinafter referred to as "PU emulsion N". The PU emulsion N was evaluated, and the results are shown in Table 1.

TABLE 1

| | Code of Em | Solvent Resistance | | Water Resistance | | Compatibility with Other |
| | | Degree of Dissolution (%) | Degree of Area Swelling (%) | Degree of Dissolution (%) | Degree of Area Swelling (%) | Emulsions to Give Stable Mixtures EVA-Em |
|---|---|---|---|---|---|---|
| Example 1 | A | 5 | 100 | 3 | 0 | ○ |
| Example 2 | B | 4 | 90 | 3 | 0 | ○ |
| Example 3 | C | 6 | 120 | 4 | 0 | ○ |
| Example 4 | D | 4 | 90 | 3 | 0 | ○ |
| Example 5 | E | 3 | 80 | 1 | 0 | ○ |
| Example 6 | F | 4 | 100 | 3 | 0 | ○ |
| Example 7 | G | 5 | 100 | 3 | 0 | ○ |
| Example 8 | H | 6 | 130 | 4 | 0 | ○ |
| Example 9 | I | 4 | 90 | 3 | 0 | ○ |
| Example 10 | J | 4 | 90 | 2 | 0 | ○ |
| Comparative Example 1 | (*1) | — | — | — | — | — |
| Comparative Example 2 | K | 12 | 150 | 8 | 0 | Δ |
| Comparative Example 3 | L | 15 | 130 | 11 | 1 | x |
| Comparative Example 4 | M | 16 | 140 | 12 | 1 | Δ |
| Comparative Example 5 | N | 16 | 140 | 12 | 1 | x |

(*1): Stable emulsion not obtained.

Examples 11 to 14

To the PU emulsion prepared in Example 3, added was any of the compounds shown in Table 2 to produce adhesives. The adhesives were subjected to an adhesion test under the condition mentioned below, in which a flexible PVC sheet and a lauan plywood sheet were adhered to each other with each adhesive. The test data are shown in Table 3.

Condition for Adhesion
Subjects: Flexible PVC sheet (thickness: 1 mm)/lauan plywood sheet (Type 1, thickness: 5.5 mm)
Amount of adhesive applied: 10 g/30×30 cm
Curing: After having been adhered with the adhesive, the subjects were lightly pressed with a rubber hand roller, and kept at 20° C. and 65% RH for 3 days for curing the adhesive.
Test Condition
Ordinary strength: Each sample was cut to have a width of 1 inch, and directly peeled at 180 degrees (200 mm/min).
Water resistance strength: After having been dipped in water for 24 hours, the wet sample was peeled at 180 degrees (200 mm/min).
Heat-resistant creep: At 80° C. and 95% RH, each sample was peeled at 90 degrees under a load of 1 kg, and the peeled length/hr was measured.

TABLE 2

| | Adhesive Composition (wt. pts. of solid content) | |
|---|---|---|
| | PU Emulsion | Compound |
| Example 11 | PU Emulsion (100) | Epoxy Compound (5) |
| Example 12 | PU Emulsion (100) | Aziridine Compound (5) |
| Example 13 | PU Emulsion (100) | Oxazoline-containing Compound (5) |
| Example 14 | PU Emulsion (100) | Isocyanate Compound (5) |

Epoxy Compound: ethylene glycol diglycidyl ether
Aziridine Compound: 4,4'-bis(ethyleniminocarbonylamino)diphenylmethane dispersion
Oxazoline-containing Compound: 2,2'-ethylenebis(2-oxazoline)
Isocyanate Compound: CR-60N (from Dai-Nippon Ink Chemical Industry)

TABLE 3

| | Adhesion Test | | |
|---|---|---|---|
| | Ordinary Strength (kg/inch) | Water resistance Strength (kg/inch) | Heat-Resistant Creep (mm/hr) |
| Example 11 | 5.4 | 1.8 | 1 |
| Example 12 | 4.7 | 1.6 | 2 |
| Example 13 | 4.8 | 1.7 | 1 |
| Example 14 | 4.8 | 1.6 | 2 |

Ordinary strength: The sample was cut to have a width of 1 inch, and directly peeled at 180 degrees (200 mm/min).
Water resistance strength: After having been dipped in water for 24 hours, the wet sample was peeled at 180 degrees (200 mm/mmn).
Heat-resistant creep: At 800° C. and 95% RH, the sample was peeled at 90 degrees under a load of 1 kg, and the peeled length/hr was measured.

Examples 15 to 21

Herein prepared were aqueous coating compositions comprising the PU emulsion of Example 3; an aqueous coating composition comprising the PU emulsion of Example 2 and the compound shown in Table 4; and an aqueous coating composition comprising a PU emulsion as prepared in the same manner as in Example 4 (in this, however, an acetoacetyl-having PVA was used in place of the amino-modified PVA in Example 4, and the acetoacetyl-having PVA was prepared through solid-vapor reaction of PVA with diketene, and had a degree of polymerization of 1000, a degree of hydrolysis of 97.5 mol %, and an acetoacetyl content of 5 mol %), and the compound shown in Table 4.

These coating compositions were separately applied onto substrates of PET films and polyvinyl chloride sheets and evaluated for their coatability. The aqueous coating compositions of Examples 15 to 21 were separately applied onto PET films to form thereon a coating film having a thickness of 20 microns, and forcedly dried at 80° C. The thus-prepared test pieces were subjected to the following tests to evaluate their properties. The test data are shown in Table 5.

Coating Film Adhesiveness

The surface of the coating film as formed on each test piece by applying the aqueous coating composition onto the substrate was scratched at regular intervals of 2 mm in two directions perpendicular to each other to form square cross cuts of 5×5=25. An adhesive cellophane tape was applied under pressure onto the thus cross-cut surface, and then peeled away, whereupon the number of the cross cuts still remained on the surface of the test piece but not adhered to the adhesive tape was counted. The larger number of the cross cuts not adhered to the adhesive tape indicates that the adhesiveness of the coating film is larger. The test pieces in ordinary condition and those having been dipped in water at 40° C. for 24 hours were subjected to this test, and evaluated for their properties.

Solvent Resistance Test

Acetone was dropped onto the surface of the coating film of each test piece, and the surface was rubbed. This is a rubbing test for solvent resistance of the coating film. After having been rubbed, the surface of the coating film was observed. For their solvent resistance evaluation, those with "○○" are excellent; those with "○" are good; those with "Δ" are bad in some degree; and in those with "×", the coating film was peeled.

Water resistance Test

Test pieces were dipped in water at 20° C. for 1 week, and the surface of the coating film on each was observed. For their water resistance evaluation, those with "○○" are excellent; in those with "○", the coating film was partly whitened; in those with "Δ", the coating film was whitened; and in those with "×", the coating film was peeled.

TABLE 4

| | Coating Composition (wt. pts. of solid content) | |
| --- | --- | --- |
| | PU Emulsion | Compound |
| Example 15 | PU Emulsion (Example 3) (100) | — |
| Example 16 | PU Emulsion (Example 2) (100) | Epoxy Compound (5) |
| Example 17 | PU Emulsion (acetoacetyl-PVA used) (100) | Epoxy Compound (5) |
| Example 18 | PU Emulsion (Example 4) (100) | Aziridine Compound (5) |
| Example 19 | PU Emulsion (Example 4) (100) | Oxazoline-containing Compound (5) |
| Example 20 | PU Emulsion (Example 4) (100) | Isocyanate Compound (5) |
| Example 21 | PU Emulsion (Example 4) (100) | Epoxy Compound (20) |

Epoxy Compound: ethylene glycol diglycidyl ether
Aziridine Compound: 4,4'-bis(ethyleniminocarbonylamino)diphenylmethane dispersion
Oxazoline-containing Compound: 2,2'-ethylenebis(2-oxazoline)
Isocyanate Compound: CR-60N (from Dai-Nippon Ink Chemical Industry)

TABLE 5

| | Adhesiveness Test | | Solvent Resistance Test | Water-resistance Test |
| --- | --- | --- | --- | --- |
| | Ordinary Condition | After Dipped in Warm Water | | |
| Example 15 | 25 | 10 | ○ | ○ |
| Example 16 | 25 | 15 | ○○ | ○○ |
| Example 17 | 25 | 15 | ○○ | ○○ |
| Example 18 | 25 | 20 | ○○ | ○○ |
| Example 19 | 25 | 15 | ○○ | ○○ |
| Example 20 | 25 | 15 | ○○ | ○○ |
| Example 21 | 25 | 15 | ○ | ○ |

Adhesiveness Test (Cross-Cut Peeling Test)

Adhesive cellophane tape applied to 2×2 mm cross cuts, and peeled. Tested for ordinary condition samples and wet samples (dipped in water at 40° C. for 24 hours). The number of remaining cross-cuts among 25 cross cuts counted.

Solvent Resistance Test

Acetone dropped onto the coating surface, and rubbed. Samples with "○○" are excellent; those with "○" are good; those with "Δ" are bad in some degree; in those with "×", the coating film was peeled.

Water Resistance Test

Dipped in water at 20° C. for 1 week, and the coating film observed.

Samples with "○○" are excellent; in those with "○", the coating film was partly whitened; in those with "Δ", the coating film was whitened; in those with AXE, the coating film was peeled.

The PU emulsion obtained according to the invention gives a film having good solvent resistance and water resistance, and has good compatibility with various aqueous emulsions and with salt solutions. Therefore, it has many useful applications for aqueous coating agents, for example, for industrial fibers, leathers, interior decorations, apparel materials, floorboards (of woody or concrete materials, or for polishing floorboards), plastic parts, etc.; as well as for packaging materials (wrappers, etc.), laminating promoters (for film/foil or fiber lamination, etc.), aqueous adhesives for ordinary industrial use (for adhesion of polyvinyl chloride sheet/wood, polyvinyl chloride sheet/metal, metal/wood, etc.), glass fiber binders, ink compositions, aqueous paint compositions, recording material for inkjet, carpet backing agents, etc. In addition, since the film from the PU emulsion obtained according to the invention has good moisture-permeability, it is also effectively used for producing laminates, leatherette products, etc., having a moisture-permeability.

While the invention has been described in detail and with reference to specific embodiments thereof, it will be apparent to one skilled in the art that various changes and modifications can be made therein without departing from the spirit and scope thereof.

What is claimed is:

1. A method for producing an aqueous emulsion of polyurethane, which comprises reacting (A) a polyurethane prepolymer having an isocyanate group in the molecule, (B) a polyvinyl alcohol modified by being substituted with at least one member selected from the group consisting of an amino group and a primary hydroxyl group, and (C) a low-molecular compound having an amino group and/or a hydroxyl group, in an aqueous medium.

2. A method for producting an aqueous emulsion of ployurethane, which comprises emulsifying (A) a ployuerethane prepolymer having an isocyanate group in the molecule in an aqueous medium in the presence of (B) polyvinyl alcohol modified by being substituted with at least one member selected from the group consisting of an amino group and a primary hydroxyl group, followed by adding thereto (C) a low-molecular compound having an amino group and/or a hydroxyl group to thereby make the components (A), (B) and (C) reacted in the aqueous medium.

3. The method for producing an aqueous emulsion of polyurethane as claimed in claim 1, wherein the polyvinyl alcohol (B) is an amino substituted polyvinyl alcohol.

4. The method for producing an aqueous emulsion of polyurethane as claimed in claim 1, wherein the polyvinyl alcohol (B) is a primary hydroxyl substituted polyvinyl alcohol.

5. The method for producing an aqueous emulsion of polyurethane as claimed in of claim 1, wherein the polyurethane prepolymer (A) has an anionic group as bonded thereto through covalent bonding, and at least a part of said anionic group in the polyurethane prepolymer forms a salt with a cationic compound.

6. The method for producing an aqueous emulsion of polyurethane as claimed in claim 1, wherein a nonionic surfactant is used in emulsifying the polyurethane prepolymer (A) in the aqueous medium.

7. An aqueous emulsion of polyurethane as obtained through reaction of (A) a polyurethane prepolymer having an isocyanate group in the molecule, (B) a polyvinyl alcohol modified by being substituted with least one member selected from the group consisting of an amino group and a primary hydroxyl group, and (C) a low-molecular compound having an amino group and/or a hydroxyl group in an aqueous medium.

8. An aqueous composition comprising incorporating a compound having, in the molecule, at least two functional groups selected from aziridine, epoxy, oxazoline, oxazine, isocyanate, and carbodiimide groups into the aqueous emulsion of polyurethane as claimed in claim 7.

9. An aqueous adhesive comprising the aqueous emulsion as claimed in claim 7.

10. An aqueous adhesive comprising the aqueous composition as claimed in claim 8.

11. An aqueous coating agent comprising the aqueous emulsion as claimed in claim 7.

12. An aqueous coating agent comprising the aqueous composition as claimed in claim 8.

13. A polyurethane as obtained through reaction of (A) a polyurethane prepolymer having an isocyanate group in the molecule, (B) a polyvinyl alcohol modified by being substituted with at least one member selected from the group consisting of an amino group and a primary hydroxyl group, and (C) a low-molecular compound having an amino group and/or a hydroxyl group in an aqueous medium.

* * * * *